Figure 3:
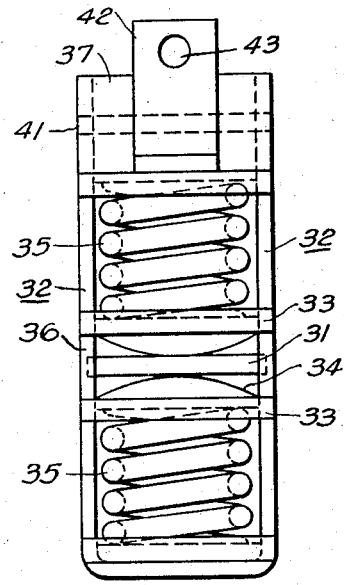

July 7, 1931.                    C. BETHEL                    1,813,140
                        RAILWAY MOTOR SUSPENSION
                Filed Jan. 25, 1928              2 Sheets-Sheet 1
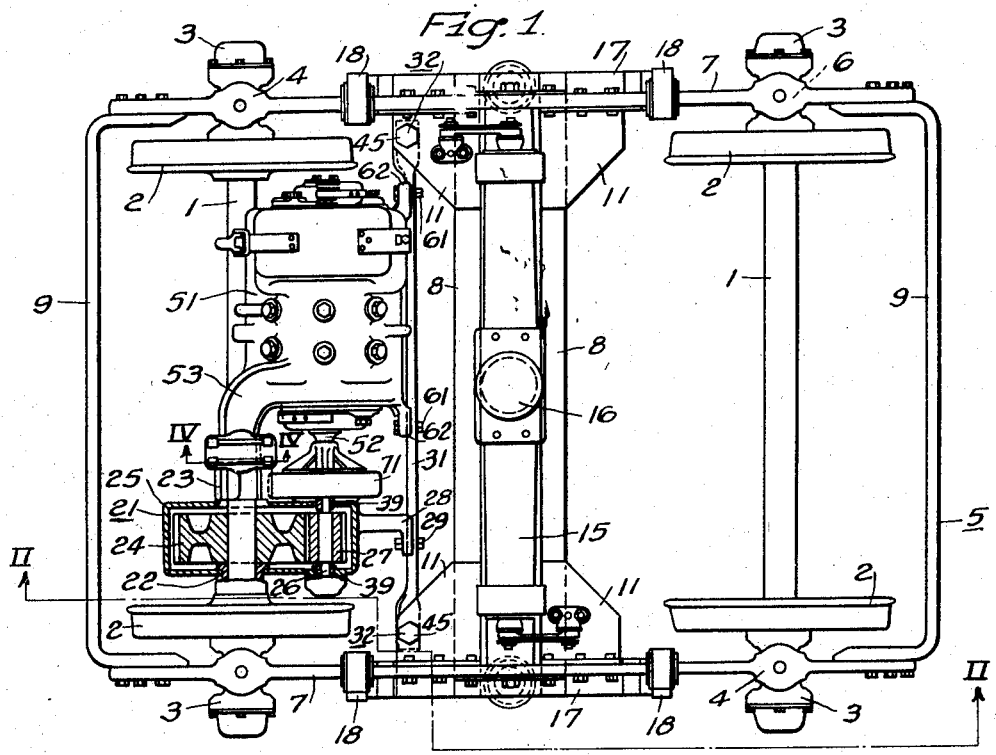
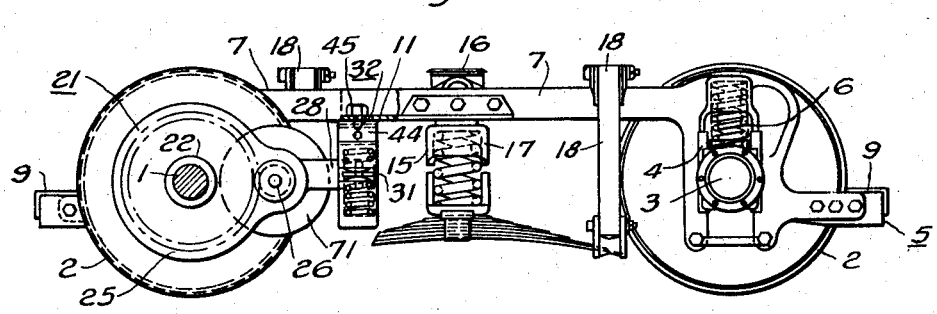
INVENTOR
*Claude Bethel.*
BY
ATTORNEY July 7, 1931.　　　　　C. BETHEL　　　　　1,813,140
RAILWAY MOTOR SUSPENSION
Filed Jan. 25, 1928　　　2 Sheets-Sheet 2

INVENTOR
Claude Bethel.
BY
　　　ATTORNEY

Patented July 7, 1931

1,813,140

UNITED STATES PATENT OFFICE

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA

RAILWAY MOTOR SUSPENSION

Application filed January 25, 1928. Serial No. 249,262.

My invention relates to vehicle trucks and in particular to means for supporting a driving motor in a truck structure.

Heretofore the driving motors for trucks such as railway vehicle trucks have, in general, either been journalled directly upon the truck axle or, in some instances, supported entirely on the truck frame member. It is well known that the practice of journalling a railway vehicle driving motor directly upon the truck axle has certain disadvantages in that the dynamic forces developed as a result of irregularities in the track upon which the vehicle may be operating are transmitted directly to the driving motor. An attempt has been made to remedy this condition by mounting the motor entirely upon the truck frame and transmitting power from the motor to the truck axle by means of a flexible coupling or universal joint mechanism.

However, it has been found that the relative movement between the truck axle and the shaft of the driving motor under normal operating conditions is of such magnitude that it is difficult to provide flexible connecting means that are capable of transmitting under such conditions the required power.

The present invention provides means for resiliently supporting one side of a driving motor on the truck frame by means of a suspension bar and resiliently supporting the other side of the motor on one of the truck axles in such manner that the motor is entirely spring-borne with respect to the truck axle, yet so associated with it that the truck axle and the motor armature shaft tend to move in unison with little relative movement. A speed reduction gear train for transmitting torque from the motor to the truck axle is mounted on the truck axle and supported on the frame by the resiliently mounted motor suspension bar. A flexible coupling is provided for transmitting power from the motor armature shaft to the gear train or transmission mechanism.

It is an object of my invention to provide a railway vehicle truck in which the driving motor is resiliently supported with respect to the driven wheel axle in such manner that the relative movement between the truck axle and the motor armature shaft is reduced to a minimum.

Another object of my invention is to provide a railway vehicle truck in which a driving motor and a unitary transmission mechanism each have one side mounted on a suspension bar that is resiliently supported on the truck frame member.

A further object of my invention is to provide a driving mechanism for railway vehicle trucks that is efficient and quiet in operation and that may be readily removed from the truck structure as a unit.

Various other objects of the invention may be ascertained from an inspection of the accompanying drawings or will be more fully set forth in the following description that appertains to one form of vehicle truck embodying my invention.

Figure 4:
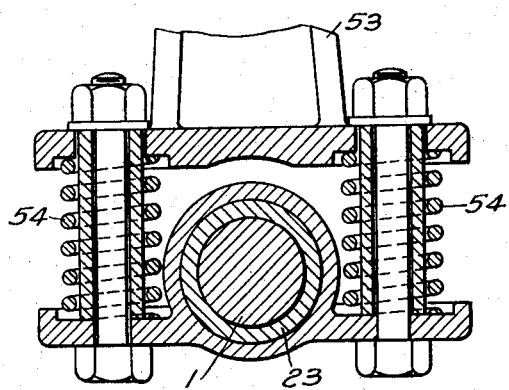
Figure 5:
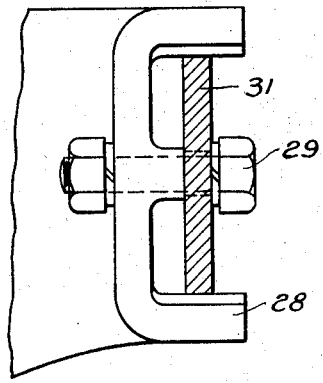
Figure 6:
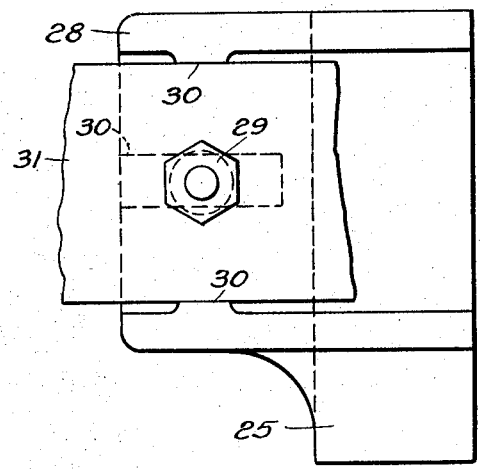

In the accompanying drawings,

Figure 1 is a plan view of a railway vehicle truck and driving mechanism constructed in accordance with the principles of the invention, Fig. 2 is a view partially in elevation and partially in section of the vehicle truck taken along the line II—II of Fig. 1, Fig. 3 is a view in elevation of a spring hanger embodied in the truck structure, Fig. 4 is a view in section of a spring system for supporting the motor on the truck axle taken along the line IV—IV of Fig. 1, Fig. 5 is a view in elevation of the bracket for attaching the gear casing to the suspension bar, and Fig. 6 is a view in end elevation of the bracket shown in Fig. 5.

Referring to Figs. 1 and 2 of the drawings, the railway vehicle truck therein illustrated comprises, in general, a pair of wheel axles 1 that are provided with the usual flanged wheels 2 and are journalled in journal boxes 3. The journal boxes 3 are disposed to slide vertically within pedestal jaws 4 that constitute a part of a truck frame member 5 of conventional design. In order that the truck frame member 5 may be resiliently supported upon the wheel axles 1, helical spring elements 6 are provided between the tops of the journal boxes 3 and the upper portions of the pedestal jaw members 4.

As shown in the drawings, the frame member 5 comprises a pair of side frame members 7 that are interconnected by means of cross-bars or transoms 8 disposed near the center of the truck and by cross members 9 at either end thereof. In order to further strengthen this construction, angle pieces or gusset plates 11 are provided at the junctions of the transoms 8 with the side frame members 7, as shown in Fig. 1 of the drawings. To provide means for mounting a car body upon the vehicle truck, a swing bolster 15 having a center pin or king-bolt connection 16 is disposed laterally of the truck frame and between the transom members 8. The swing bolster 15 is supported on the truck frame 5 by means of spring systems 17 that are attached to the side frame members 7 by means of swing links 18.

The driving mechanism that constitutes the subject-matter of my invention comprises a gear reduction unit 21 that is mounted upon the wheel axle 1 adjacent one of the wheels 2 by means of journal bearings 22 and 23. The bearings 22 and 23 are disposed on either side of a gear wheel 24, that is securely mounted on the axle 1, and serve to support a gear casing or housing 25. The housing 25 entirely encloses the gear wheel 24 and is provided with a pinion shaft 26 that is journalled therein by means of bearings 39 and upon which is mounted a pinion 27 for cooperating with the gear wheel 24.

To provide means for supporting the housing 25, a bracket 28 is provided on the end thereof, and is adjacent the pinion shaft 26. The bracket 28 is secured by means of a bolt 29 to a suspension bar 31 that is disposed transversely of the truck frame 5 and adjacent and substantially parallel to one of the truck transom members 8.

In order that the suspension bar may be resiliently mounted upon the truck frame 5, spring hangers or stirrups 32 are provided at either end thereof. As shown in Fig. 3, the spring hangers 32 comprise spring stops 33 having spherical faces 34 that are disposed to engage opposite sides of the suspension bar 31. Spring elements 35 are disposed to engage the spring stops 33 and are confined within a U-shaped supporting member 36 that serves as a guide for the spring stops 33. A member 37 is provided at the open end of the U-shaped member 36 to constitute means for retaining the spring elements 35 and the stop members 33 in their proper operating positions. In order that the spring hangers 32 may be universally supported from the gusset plate 11, as shown in Figs. 1 and 2, a pivot pin 41 is provided for securing the stirrup member 36 to a block 42 and a second pivot pin 43 that extends through the block 42 at right angles to the pivot 41 is provided for engaging a supporting bracket 44 that is secured to the gusset plate 11 by means of a bolt 45 as shown in Figs. 1 and 2.

A vehicle propelling motor 51 is disposed between the truck axle 1 and the suspension bar 31 in such manner that its armature shaft 52 extends substantially parallel to the axle 1 and in substantial alignment with the pinion shaft 26 of the transmission mechanism 21.

In order that the motor 51 may be resiliently supported upon the truck axle 1, a supporting arm 53 is provided at the side of the motor adjacent the axle 1 in such manner that the end of the arm is disposed directly above the journal bearing 23 on the transmission mechanism 21. As shown in Fig. 4, helical springs 54 are disposed between the supporting arm 53 and the journal bearing 23 in such manner that the arm 53 is normally retained in fixed relation to the bearing 23. In this construction, road shocks and vibrations that are generally vertical are not transmitted to the motor 51 for the reason that the journal bearing 23 may move upwardly with respect to the supporting arm 53, by compressing the springs 54.

The side of the motor 51 farthest from the axle 1 is secured to the suspension bar 31 by means of bolts 61 that engage lugs 62 disposed at either end of the motor 51 and formed integrally with the motor casing. The manner in which the bracket 28 is secured to the suspension bar 31 is illustrated in detail in Figs. 5 and 6. As shown in the drawings, the contact surfaces 30 of the gear casing supporting bracket 28 are made comparatively small to permit slight movement of the gear casing relative to the suspension bar 31. In order to transmit power from the motor armature shaft 52 to the pinion shaft 26, a flexible coupling 71 of any suitable design is provided for connecting the adjacent ends thereof.

It will be observed that when the truck structure embodying the features of my invention is in operation, the driving motor 51 and the transmission mechanism 21 will tend to move as a unit in response to movement of the truck axle 1 relative to the truck frame 5 inasmuch as the motor and transmission mechanism are both secured to the supporting bar 31 which is, in turn suspended from the frame 5 in such manner that it is permitted to move in all directions under resilient restraint.

Thus the motor armature shaft 52 and the pinion shaft 26 are maintained in alignment under conditions of lateral or longitudinal displacement of the axle 1 relative to the truck frame 5. Further the shafts 52 and 26 remain in alignment for any motion of the truck axle 1, as long as it remains substantially parallel to the armature shaft 52.

When the axle 1 moves in such manner that it changes its angular position relative to the armature shaft 52, the motor and the suspension bar 31 will tend to follow the movement of the axle 1 to a large extent and the resulting slight mis-alignment between the armature shaft 52, and the pinion shaft 26 will be taken care of by the flexible coupling 71. In case the wheels 2 encounter rough spots on the rails over which the truck may be operating the axle 1 may be lifted suddenly thereby compressing the spring 54 between the journal bearing 23 and the motor supporting arm 53, and cause a slight momentary mis-alignment between the armature shaft 52 and the pinion shaft 26. It will be readily seen that this mis-alignment between the shafts will be approximately only one-half of the deflection of the spring 54.

The springs 54 and the springs 35 in the spring hanger 32 may be so designed that when the torque reaction of the pinion 27 acts upon the motor 51 and the gear casing 25, the springs 54 and the springs 35 will be deflected by such an amount that the armature shaft 52 and the pinion shaft 26 will be maintained in substantial alignment.

From the foregoing description it may be seen that the invention has provided means for resiliently supporting a driving motor in a truck frame in such manner that the motor is held in proper operating relationship to the truck axle at all times, although I have described a specific embodiment of my invention, it will be obvious to those skilled in the art that various changes may be made in the details of the supporting structure and the general arrangement of parts without departing from the spirit and scope of the invention, as defined in the appended claims.

I claim as my invention:

1. In a railway vehicle truck, in combination, a truck frame, a wheel axle for supporting the truck frame, a transmission mechanism mounted on the wheel axle and supported by the truck frame, a motor resiliently mounted on the truck frame and on the wheel axle independently of the transmission mechanism and means for transmitting power from the motor to the transmission mechanism.

2. In a railway vehicle truck, in combination, a pair of wheel axles, a truck frame resiliently supported on the wheel axles, a power transmission mechanism mounted on one of the wheel axles and resiliently suspended from the truck frame, a motor resiliently supported in the truck frame independently of the power transmission mechanism and means for transmitting power from the motor to the transmission mechanism.

3. A railway vehicle truck comprising a truck frame, a plurality of axles for supporting the truck frame, a transversely disposed spring suspension mechanism mounted in the truck frame, a unitary drive mechanism mounted on an axle and having one end thereof secured to the spring suspension mechanism, a motor mounted on the spring suspension mechanism independently of the unitary drive mechanism and resiliently supported on said axle, and means for transmitting power from the motor to the drive mechanism.

4. A railway vehicle truck comprising a plurality of wheel axles, a frame member resiliently mounted on the wheel axles, a drive mechanism journalled on one of the wheel axles and resiliently supported on the truck frame, a motor resiliently supported on said wheel axle and on the truck frame and a flexible coupling for transmitting power from the motor to the drive mechanism.

5. In a railway vehicle truck, in combination, a pair of wheel axles, a truck frame resiliently supported on the wheel axles, a suspension bar disposed parallel to the axles and resiliently supported from the frame, a gear case journalled on one of the wheel axles and secured to the suspension bar, a gear-train within the gear case, a motor resiliently mounted on said wheel axle and secured to the suspension bar and flexible coupling means for transmitting power from the motor to the gear train.

6. In a railway vehicle in combination, a truck frame, a pair of wheel axles resiliently mounted in the truck frame, a gear-train housing journalled on one of the wheel axles and resiliently supported by the frame, a gear train within the housing, a driving motor resiliently supported on said wheel axle and on the frame and means for transmitting power from the motor to the gear train.

7. In a railway vehicle truck, a pair of wheel axles, a frame resiliently supported on the wheel axles, a gear wheel mounted on one of the wheel axles, a pair of journal bearings disposed one on each side of the gear wheel, a gear casing mounted on the journal bearings, a pinion shaft journalled in the gear casing, a pinion mounted on the pinion shaft for cooperating with the gear wheel on the axle, resilient means for supporting the gear case from the frame, a motor resiliently mounted on one of the journal bearings and having one side resiliently suspended from the frame and flexible means for transmitting power from the motor to the pinion shaft.

8. In a railway vehicle truck the combination with a pair of wheel axles and a truck frame resiliently mounted on the wheel axles, of a motor for driving one of the wheel axles, said motor being resiliently supported at two points on the truck frame and resiliently supported at a third point on the driven wheel axle, and means for transmitting power from the motor to the driving wheel axle.

9. In a railway-vehicle truck, in combination, a truck frame, a wheel axle for supporting the truck frame, a motor resiliently mounted on the truck frame and the wheel axle, and a transmission mechanism journalled on the wheel axle and resiliently supported from the frame for transmitting power from the motor to the wheel axle.

In testimony whereof, I have hereunto subscribed my name this 23rd day of January, 1928.

CLAUDE BETHEL.